US008175790B2

(12) United States Patent
Stemler et al.

(10) Patent No.: US 8,175,790 B2
(45) Date of Patent: May 8, 2012

(54) ENGINE DROOP GOVERNOR AND METHOD

(75) Inventors: Eric D. Stemler, Peoria, IL (US); Matthew Mowers, Wilmington, IL (US); Evan E. Jacobson, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 655 days.

(21) Appl. No.: 12/366,477

(22) Filed: Feb. 5, 2009

(65) Prior Publication Data

US 2010/0192907 A1 Aug. 5, 2010

(51) Int. Cl.
*G06F 19/00* (2006.01)
*F02D 41/40* (2006.01)
*F02D 31/00* (2006.01)

(52) U.S. Cl. ........ 701/110; 701/102; 701/104; 123/350; 123/357

(58) Field of Classification Search .................. 123/349, 123/350, 352, 357, 361, 376, 402, 403, 478, 123/480, 492, 493, 500–502; 701/50, 54, 701/101–105, 110, 114, 115
See application file for complete search history.

(56) References Cited

U.S. PATENT DOCUMENTS

| | | | | |
|---|---|---|---|---|
| 3,557,765 | A * | 1/1971 | Nystrom | 123/387 |
| 3,695,242 | A | 10/1972 | Tada et al. | |
| 3,757,750 | A | 9/1973 | Ohtani | |
| 4,307,690 | A | 12/1981 | Rau et al. | |
| 4,471,738 | A | 9/1984 | Smojver | |
| 4,604,976 | A | 8/1986 | Sturdy | |
| 4,955,344 | A | 9/1990 | Tatsumi et al. | |
| 5,215,056 | A | 6/1993 | Harada et al. | |
| 5,224,045 | A | 6/1993 | Stasell | |
| 5,386,698 | A * | 2/1995 | Kamel | 60/603 |
| 5,553,589 | A | 9/1996 | Middleton et al. | |
| 5,586,536 | A | 12/1996 | Seo et al. | |
| 5,606,948 | A | 3/1997 | Gonnering | |
| 5,868,214 | A | 2/1999 | Workman | |
| 6,460,421 | B1 * | 10/2002 | Hasegawa et al. | 73/862.29 |
| 6,944,532 | B2 | 9/2005 | Bellinger | |
| 6,959,241 | B2 * | 10/2005 | Itow et al. | 701/102 |
| 7,165,531 | B2 | 1/2007 | Bratvold et al. | |
| 7,632,179 | B2 * | 12/2009 | Brome et al. | 460/6 |
| 2010/0031650 | A1 * | 2/2010 | Morinaga et al. | 60/459 |

* cited by examiner

*Primary Examiner* — Willis Wolfe, Jr.
(74) *Attorney, Agent, or Firm* — Leydig, Voit & Mayer

(57) ABSTRACT

A machine (100) has an internal combustion engine (104) operating in response to a control signal provided by an engine governor (216). The engine (104) provides a torque output to a machine system providing a machine function. An electronic controller (214) determines a current operating state of the engine (104) and a torque utilization of the machine system, and compares the current operating state of the engine (104) with the torque utilization in an engine droop function (302). A change to an engine speed (308) setting of the engine (104) is instructed in response to a change in the torque signal. Such change is to increase the engine speed (308) setting when the torque utilization is increasing, and to decrease the engine speed (308) setting when the torque utilization is decreasing.

20 Claims, 7 Drawing Sheets

ENGINE DROOP GOVERNOR AND METHOD

TECHNICAL FIELD

This patent disclosure relates generally to electronic engine control and, more particularly, to an engine controller and method for controlling the speed of an engine using droop functionality.

BACKGROUND

Control of engine operation is accomplished by use of mechanical or electronic devices, which are commonly referred to as engine governors. An engine governor controls operation of the engine based on a condition or status of the engine. An engine governor, for example, may monitor and control the operation of the engine through a series of operating points, such as when a vehicle is accelerating and/or shifting gears. For gasoline or spark ignition engines, the engine governor controls engine speed by controlling a throttle valve or any other suitable device that modulates the air intake of the engine. For diesel or compression ignition engines, the engine governor may control operation of the engine based on a fuel or torque command to the engine. Regardless of the type of engine or governor being used, efficient control of the engine is desired during operation.

A typical application for automatic control of an engine during transient or changing conditions includes cruise control, such as what is used on vehicles to automatically adjust engine operation to maintain a constant vehicle speed. In other applications, such as in earthmoving equipment and other types of machines, automatic engine governing may be used to maintain a constant engine speed during work functions of the machine. Maintaining a constant engine speed in various applications is often a challenge. For example, an earthmoving machine may experience load changes during operation, which cause fluctuations in the load demanded by various work implements of the machine. Examples of such operation include a bucket loader operating to load material onto a truck, an excavator digging a hole, a bulldozer encountering an obstacle, and so forth. Fluctuations in load may directly affect engine speed.

In general, engine droop is a change of engine speed by the engine governor under certain operating conditions. In a typical application, engine droop is used in association with cruise control systems in vehicles. A cruise control system is a device that maintains a constant vehicle speed during travel by controlling engine speed. When a vehicle ascends a hill, the load on the engine increases and tends to slow the vehicle down. A cruise controller may respond to such a condition by increasing the fuel supply to the engine, and thus the power output of the engine, while maintaining a constant engine speed. The power output of the engine can increase up to a maximum power rating for the engine at any given speed. Some cruise control systems use engine droop to improve the fuel economy of the engine at high loads. This improvement is accomplished by ramping down or gradually reducing engine speed as the load on the engine increases past a predetermined level.

A typical implementation of droop curves for an engine governor can be seen in U.S. Pat. No. 5,868,214, which issued on Feb. 9, 1999 (the '214 patent). The '214 patent discloses a cruise control governor which is able to dynamically define and switch between various goal droop curves in order to find the best goal droop curve for use with a driving situation of a vehicle. Specifically, the '214 patent discloses a governor that is capable of increasing the torque generation of an engine when an engine underspeed is detected, and also capable of decreasing engine speed when the load is increasing to increase fuel economy of the vehicle. Such reduction of engine speed that is accompanied by an increase in torque is commonly referred to as "positive" or "standard" droop behavior, and is the norm in various applications.

An additional example of an engine governor using droop functionality can be seen in U.S. Pat. No. 5,553,589, which issued on Sep. 10, 1996 (the '589 patent). The '589 patent discloses a variable droop engine speed control system that includes a proportional-integral-derivative (PID) engine speed controller. The PID controller includes a droop gain that is only associated with the integral portion of the controller and that enables variation in the rate of droop applied to the engine under different conditions. Such droop is calculated dynamically in the controller during operation of the engine.

SUMMARY

In one aspect, the disclosure describes a machine having an internal combustion engine disposed to operate in response to a control signal provided by an engine governor. The engine is further disposed to provide a torque output to at least one machine system operating to utilize such torque output to provide a machine function. The machine includes an electronic controller in operable communication with the engine governor and the at least one machine system. The electronic controller is disposed to determine a current operating state of the engine and a torque utilization of the at least one machine system. The electronic controller compares the current operating state of the engine with the torque utilization in an engine droop function, and instructs a change to an engine speed setting of the engine in response to a change in the torque signal. Such change is to increase the engine speed setting when the torque utilization is increasing and to decrease the engine speed setting when the torque utilization is decreasing.

In another aspect, the disclosure describes a method of operating an engine associated with a machine. The engine is connected to at least one machine system and disposed to operate at an engine speed setting in response to a control signal provided by an engine governor. The engine provides a torque output to the at least one machine system. The method of operating the engine includes determining an operating state of the engine and a torque utilization of the at least one machine system. A change in torque utilization of the machine is also determined and combined with the torque utilization into a torque signal. The torque signal is provided to the engine governor, which in turn provides the control signal governing the speed setting of the engine based on the torque signal and the operating state of the engine. Such control signal results in an increase of the engine speed setting when the torque signal increases. Similarly, a decrease in the torque signal causes the engine speed setting to decrease.

In yet another aspect, the disclosure provides a computer-readable medium having thereon computer-executable instructions for controlling a speed of an engine providing a torque output to at least one system within a machine. The computer-executable instructions include instructions for determining an operating state of the engine and instructions for determining a torque utilization of the at least one system. Instructions for determining a change in torque utilization of the machine, and instructions for providing a torque signal based on the torque utilization and the change in torque utilization, are executed during operation. Thereafter, instructions for governing the speed of the engine based on the torque signal, which cause the speed of the engine to increase when the torque signal increases and the speed of the engine to decrease when the torque signal decreases, are executed.

DETAILED DESCRIPTION

Figure 1:
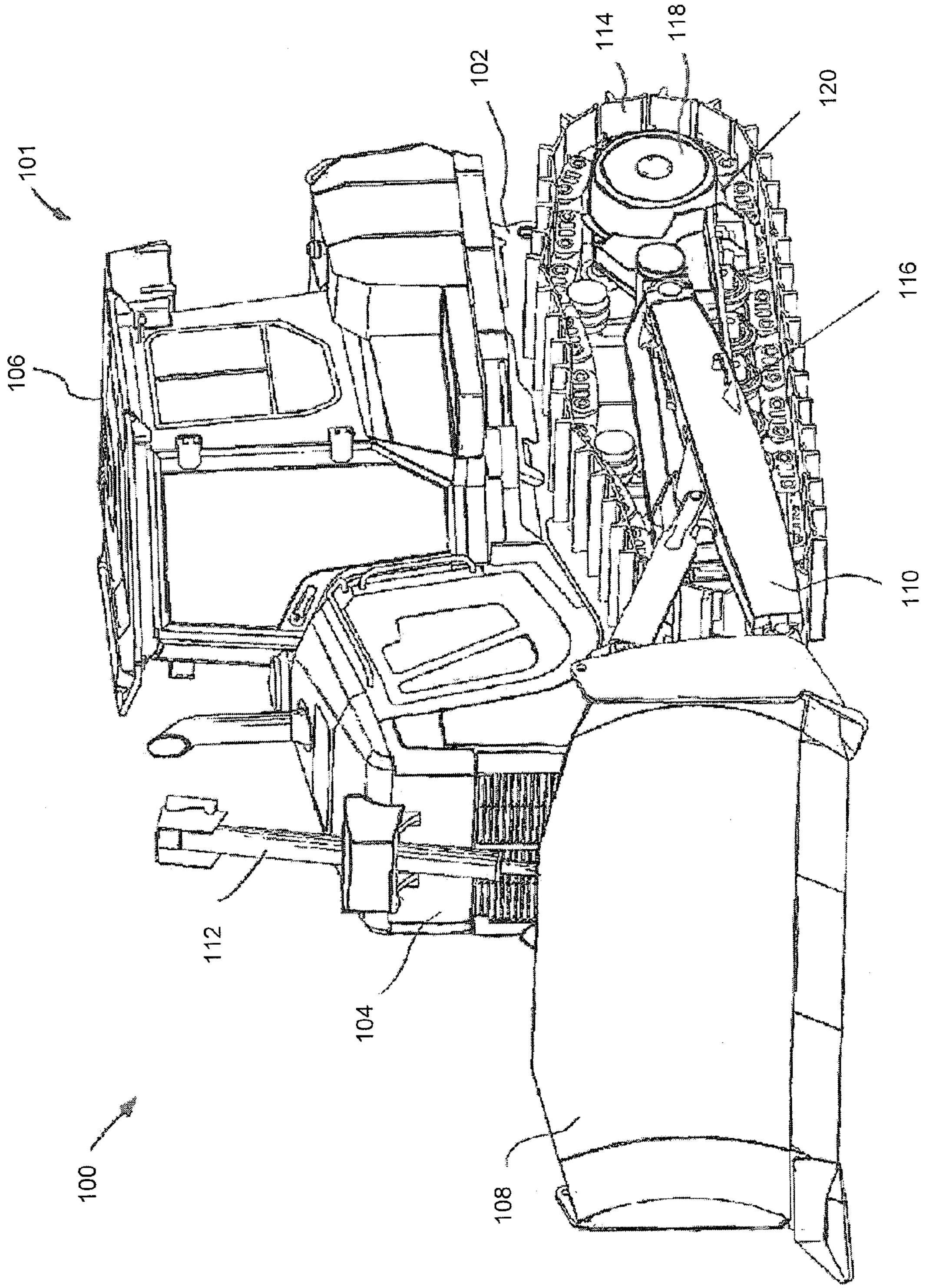
FIG. 1 is an outline view of a track-type tractor, which is illustrated as one example of a machine in accordance with the disclosure.

FIG. 1 is an outline view of one example of a machine 100. In the illustration of FIG. 1, the machine 100 is a track-type tractor 101, which is used as one example for a machine to illustrate a power management arrangement. While the arrangement is illustrated in connection with the track-type tractor 101, the arrangement disclosed herein has universal applicability in various other types of machines. The term "machine" may refer to any machine that performs some type of operation associated with an industry such as mining, construction, farming, transportation, or any other industry known in the art. For example, the machine may be an earth-moving machine, such as a wheel loader, excavator, dump truck, backhoe, motor grader, material handler or the like.

In the illustrated embodiment, the machine 100 includes a frame 102 supporting an engine 104. In the illustrated embodiment, the engine 104 is an internal combustion engine providing power to various machine systems in the form of a torque output. Operation of the machine 100 may be controlled by an operator. A blade 108 is connected via linkages 110 to the frame 102, and an actuator 112 interconnects the blade 108 to the frame 102 at a selectable position or height. The actuator 112 in the illustrated embodiment is a hydraulic cylinder.

The machine 100 may include ground engaging members, which are illustrated as two tracks 114 (only one visible) as one example, but other types may be used. In the illustrated embodiment, the two tracks 114 are associated with a series of idle rollers 116 and are driven by two electric motors (not shown) connected to final drives 118 (only one visible).

Figure 2:
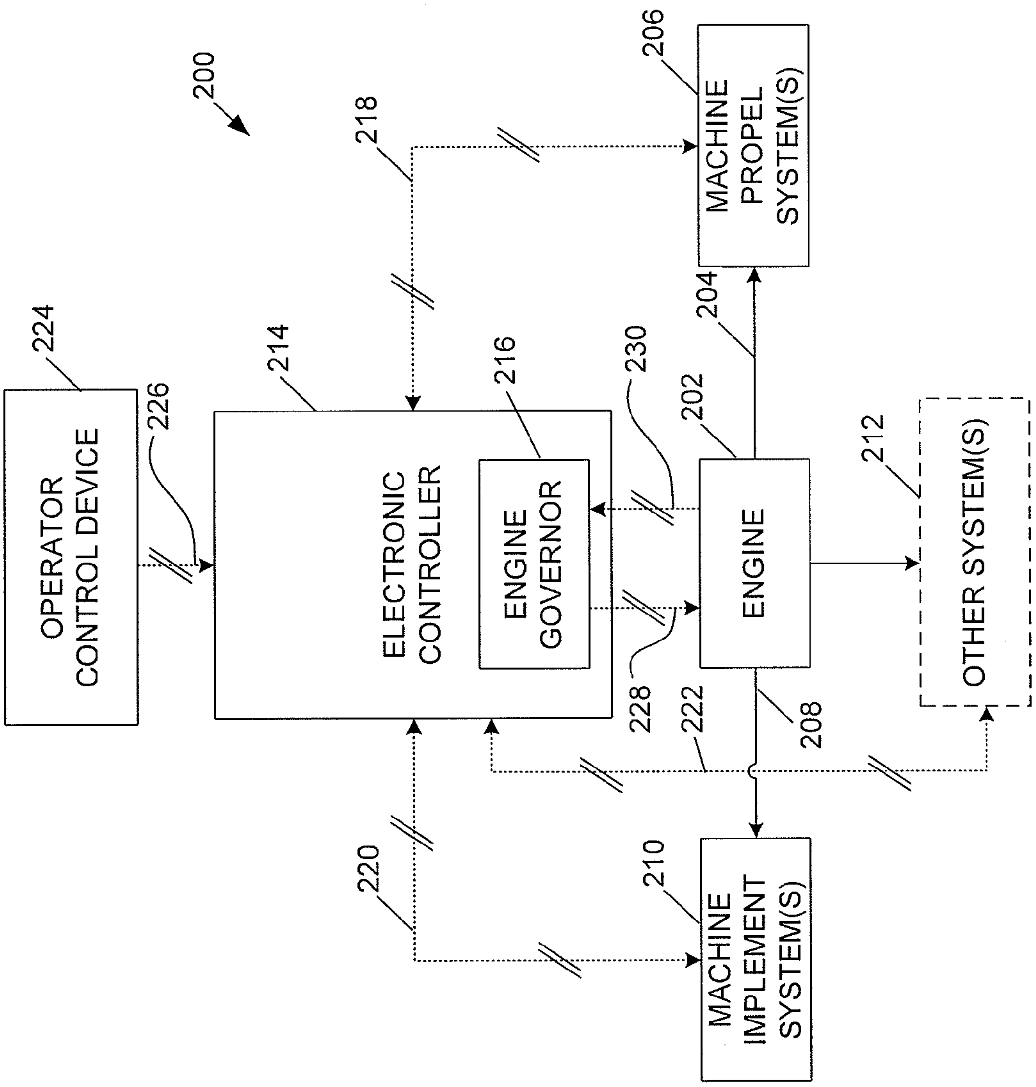
FIG. 2 is a block diagram for a machine in accordance with the disclosure.

A simplified block diagram of a power system 200 for a machine, for example, the machine 100 (FIG. 1), is shown in FIG. 2. The power system 200 includes a prime mover or, as illustrated, an engine 202. The engine 202 is arranged to provide power to various machine systems during operation. Such systems may be used to propel or otherwise move the machine, and/or provide a machine function. In the illustrated embodiment, the engine 202 provides propel power 204 to one or more systems that operate to move the machine, which is/are shown collectively as machine propel system(s) 206.

The machine propel system 206 may include one or more types of motive power generation for the machine, such as electric, hydraulic, mechanical, pneumatic, and others. The propel power 204 may, therefore, be provided in any suitable form, for example, as mechanical power from a rotating shaft, electrical power that is generated by an electric power generator or stored in the form of electrical power in batteries, capacitors, or other storage devices, and so forth. The machine propel system 206 may include one or more motors (not shown) that are arranged to rotate or otherwise actuate components that drive the machine. Alternatively, the machine propel system 206 may include one or more clutches or gear packs, for example, bevel gears, planetary gear sets, track sprockets, and so forth, that transmit power from the engine 202 in a direct drive configuration to propel the machine. In reference to FIG. 1, such motors of the machine propel system 206 may operate to rotate gears within the final drives 118, which in turn cause the two tracks 114 to rotate.

In addition to the propel power 204, the engine 202 provides an implement power 208 to one or more implements of the machine, which is/are collectively illustrated as machine implement system(s) 210. The machine implement system 210 may include any known type of actuator that uses a power input to perform a function. Such power input may be converted into mechanical power that operates a device or implement that performs a function of the machine. In reference to FIG. 1, for example, the implement power 208 may be in the form of mechanical power operating a hydraulic pump (not shown) that provides a flow of pressurized fluid to cause motion of the actuator 112.

As can be appreciated, other types of power may be used to operate various types of implements. Such implements may be utilized for a variety of tasks, including, for example, loading, compacting, lifting, brushing, and include, for example, buckets, compactors, forked lifting devices, brushes, grapples, cutters, shears, blades, breakers/hammers, augers, and others. The engine 202 may also provide power to operate other systems, which are collectively denoted by 212 in FIG. 2. Such other systems may include fans, blowers, air-conditioning compressors, lights, electronic systems, and/or other machine systems.

In the illustrated embodiment, the power system 200 includes an electronic controller 214. The electronic controller 214 may be a single controller or may include more than one controller disposed to control various functions and/or features of a machine. For example, a master controller, used to control overall operation of the machine, may be cooperatively implemented with a motor or engine governor 216, used to control the engine 202, as illustrated in FIG. 2. In this embodiment, the term "controller" is meant to include one, two, or more controllers that may be associated and that may cooperate in controlling various functions and operations of the machine.

In the illustrated embodiment, the power system 200 includes various links disposed to exchange information and command signals between the electronic controller 214 and the various systems of the machine. Such links may be of any appropriate type, and may be capable of two-way exchange of multiple signals. In one embodiment, such links may be channels of communication between various devices that are connected to one another via a confined area network (CAN). More specifically, a propel communication link 218 interconnects the electronic controller 214 with the machine propel system 206. The propel communication link 218 may provide propel commands and settings to the machine propel system 206, such as an operator command to propel the machine, which may include an actuation signal for one or more motors. The propel communication link 218 can further provide information about the machine propel system 206 to the electronic controller 214. Such information may include a torque or power consumption of the machine propel system 206 in real time during operation, the speed of operation of the one or more motors, and so forth.

In a similar fashion, an implement communication link 220 interconnects the electronic controller 214 with the machine implement system 210. The implement communication link 220 is capable of providing command signals to operate the various implements associated with the machine implement system 210, as well as to provide information about the operation of the various implements, such as torque or power utilization, to the electronic controller 214. In one embodiment, various other components and systems 212 of the machine are interconnected with the electronic controller 214 via other, respective communication links, which are collectively denoted by reference numeral 222 in FIG. 2. Such other communication links may be capable of two-way communication of information and other signals between the electronic controller 214 and the various other systems 212 of the machine.

During operation of the power system 200, information about torque or power utilization by the various systems, for example, the machine propel system 206, the machine implement system 210, and/or other systems 212, is received and processed by the electronic controller 214. Such processing of information may include various operations, including an aggregation of power utilization in the power system 200. The aggregation of power utilization may yield a total power utilization in the machine in real time. Moreover, signals indicative of imminent increases or decreases in power utilization may optionally be provided to the electronic controller 214 to improve the response of the power system 200 to changing conditions. Such signals may be used by the electronic controller 214 in an anticipatory or predictive algorithm calculating the change in torque or power utilization in the power system 200.

In one embodiment, signals indicative of imminent changes in power utilization are provided by an operator control device 224 that is connected to the electronic controller 214 via a command link 226. The operator control device 224 may be any device known in the art for causing a machine function in response to a manual command performed on the control device 224 by an operator of the machine. Such operator control devices 224 may include pedals, levers, joysticks, steering wheels, switches, knobs, and so forth. In one embodiment, a command signal from the operator control device 224 sets in motion various mechanisms that influence the torque utilization of a machine system. Such command signal may be used by the electronic controller 214 to predict changes in the then current power utilization. Predictive power utilization may be based on operator commands by the electronic controller 214. One can appreciate, however, that other methods or devices can be used to provide quantification of imminent changes in power utilization.

In the embodiment illustrated in FIG. 2, the engine governor 216 is shown integrated with the electronic controller 214, but other arrangements may be used. More significantly, the engine governor 216 is disposed to exchange information signals with the electronic controller 214 during operation. Such signals include information signals about torque utilization by the various machine systems, and further include information signals that are indicative of the power output of the engine 202. Such signal exchange may enable power balancing to be performed by the electronic controller 214 to ensure that engine power available from the engine 202 may be used by the various machine systems. As can be appreciated, efficient utilization of engine power can promote low fuel consumption and reduced noise.

The engine governor 216 is connected to the engine 202 by two communication links, an engine output link 228 and an engine input link 230. The engine output link 228 represents the ability of the engine governor 216 to provide command signals to various engine actuators and systems that control the operation of the engine. As is known, an engine governor can control engine speed and power by, for example, controlling the amount of fuel or air that enters the engine. Such engine control is typically based on various engine operating parameters, such as engine speed. Information signals that are indicative of one or more engine operating parameters are provided to the engine governor via the engine input link 230. As discussed above, the engine input and output links 230 and 228 may be embodied in any appropriate arrangement, for example, by use of CAN links that are capable of transferring more than one signals at the same time, but other arrangements may be used.

Figure 3:
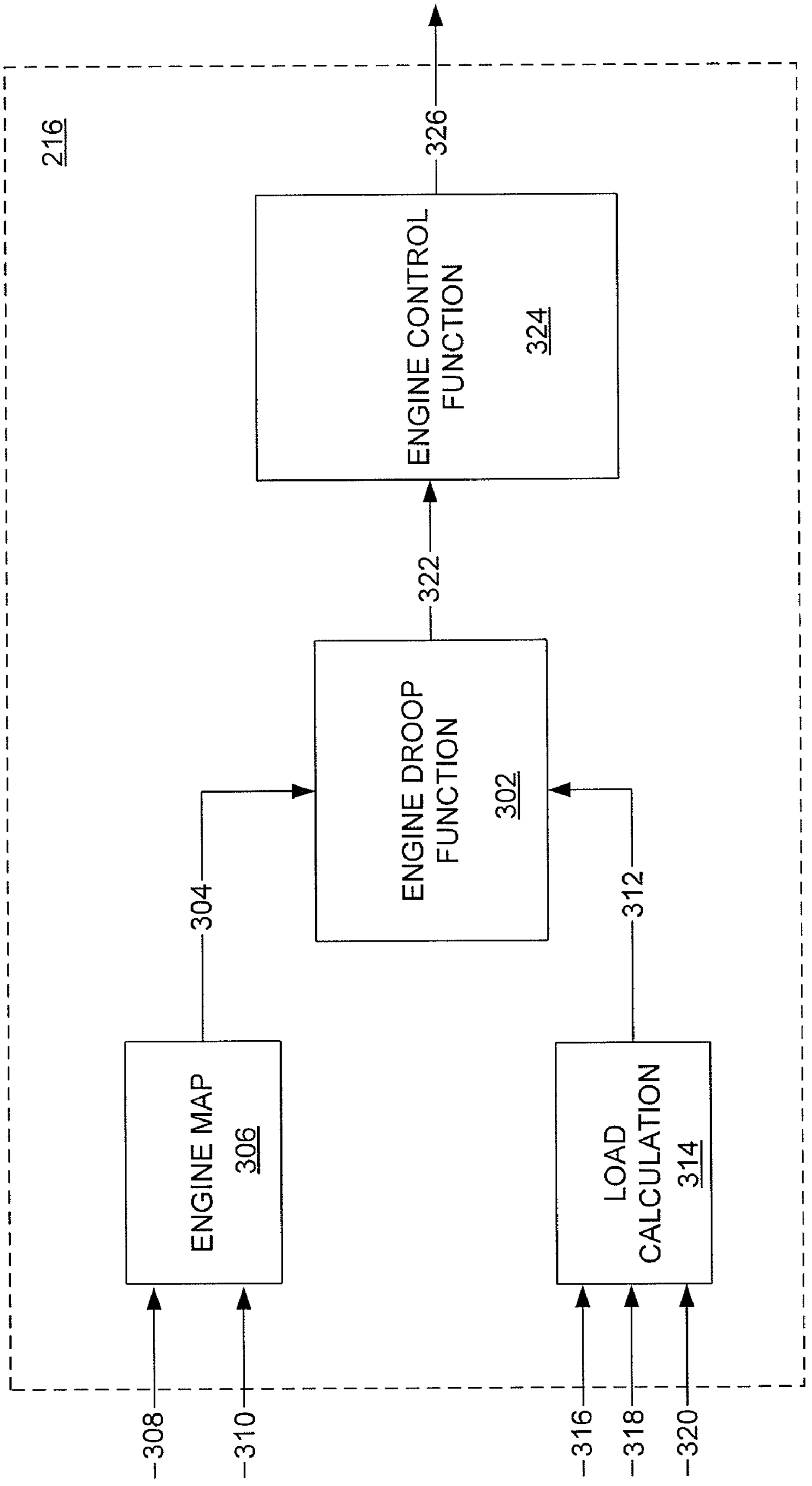
FIG. 3 is a block diagram illustrating one embodiment for an engine governor having an engine droop function in accordance with the disclosure.

A block diagram for one embodiment of a control strategy operating within the engine governor 216 is shown in FIG. 3. The illustrated embodiment includes an engine droop function 302 in accordance with the disclosure. The engine droop function 302 is arranged as a "negative" droop function and is disposed to induce the opposite effect on the engine relative to known engine droop functions. More specifically, standard engine droop functions are arranged to reduce engine speed as load on the engine increases. Such reduction in engine speed is performed to reduce fuel consumption and wear of various components of the engine, and is performed over relatively narrow ranges of engine operation. The negative droop functionality provided by the engine droop function 302 is arranged provide low fuel consumption and low noise levels by controlling the engine to operate at a low speed when little or no load is applied to the engine. When load is applied, the speed of the engine may increase as long as the load is present.

In the illustrated embodiment, the engine droop function 302 essentially receives an engine signal 304 that is indicative of a desired operating state of the engine, for example, relative to the engine speed and load point on an engine map 306. The engine map 306 represents a tabulated interrelationship between an engine speed 308, which is expressed, for example, in revolutions per minute (RPM), and a torque output 310 of the engine, which can be expressed in Nm or ft-lb. Such information is provided to a table or other function, which associates the engine speed 308 with the torque output 310 of the engine on a two-dimensional map. In one embodiment, the engine signal 304 represents a desired engine speed setting of the engine. Such desired engine speed setting may be determined based on a signal from an operator control device, such as a throttle pedal or lever. Such operator signal may be provided by a sensor and be expressed as a percentage (%) of total throttle displacement.

The engine droop function 302 further receives a load signal, which is indicative of the extent of loading that is presently on the various systems of the machine, as well as indicative of imminent changes in load as described above. Such loading information is provided to the engine droop function 302 in the form of a load signal 312, which can include a collection of two different load signals, a steady state loading signal and an estimated change in load. The load signal 312 is generated by a load calculation function 314 and is provided to the engine droop function 302. The load calculation function 314 is disposed to receive various types of information from various components and systems of the machine, process such information, and provide estimations on the torque utilization of the machine as well as changes in torque utilization.

The load calculation function 314 may receive a number of signals that can be used in the determination of torque utilization and the estimation of any changes in utilization. For example, signals provided via the propel communication link 218 and the implement communication link 220 may provide information indicative of load utilization in real time. Similarly, information provided via the command link 226 may provide information indicative of imminent changes in load utilization. Such information may be provided directly to the load calculation function 314, or may alternatively provided indirectly via the electronic controller 214 after at least some processing operations have been performed.

In the illustrated embodiment, only a few inputs are shown for the load calculation function 314 as illustrative examples. Hence, the load calculation function 314 receives a first load signal 316 that represents torque utilization by the propel system 206 (FIG. 2) of the machine. A second load signal 318 is provided and represents torque utilization by the implement system 210 (FIG. 2) of the machine. A third load signal 320 is provided and represents an expected magnitude of a torque utilization change that is imminent. Such load information is processed within the engine droop function 302, and compared to the torque output of the engine, which is provided by the engine signal 304.

The engine droop function 302 functions to maintain a low engine speed when the load utilization is relatively low, and increase the engine speed as the load utilization increases. In one embodiment, the engine droop function 302 maintains a constant idle speed for the engine when little or no load utilization is occurring, to maximize fuel savings and reduce noise. When a signal is provided indicating that a torque utilization increase is imminent, the engine droop function 302 may operate to begin increasing engine speed and engine power output such that sufficient power is available when the torque utilization materializes. In another embodiment, the engine droop function 302 reduces the desired engine speed setting that is provided via the engine signal 304 by a calculated reduction engine speed value that depends on the torque output of the engine.

Such functionality of the engine droop function 302 in accordance with the disclosure is different, and in many respects opposite, from the typical droop functions provided by engine governors. In some aspects, a typical droop governor will tend to decrease engine speed as torque utilization increases. In such similar aspects, the droop governor described herein will operate to maintain a low engine speed, which increases rather than decreases as the torque utilization increases. A graphical representation of a droop governor in accordance with the disclosure is shown in FIG. 4, to illustrate the mode of operation of the engine droop function 302.

Figure 4:
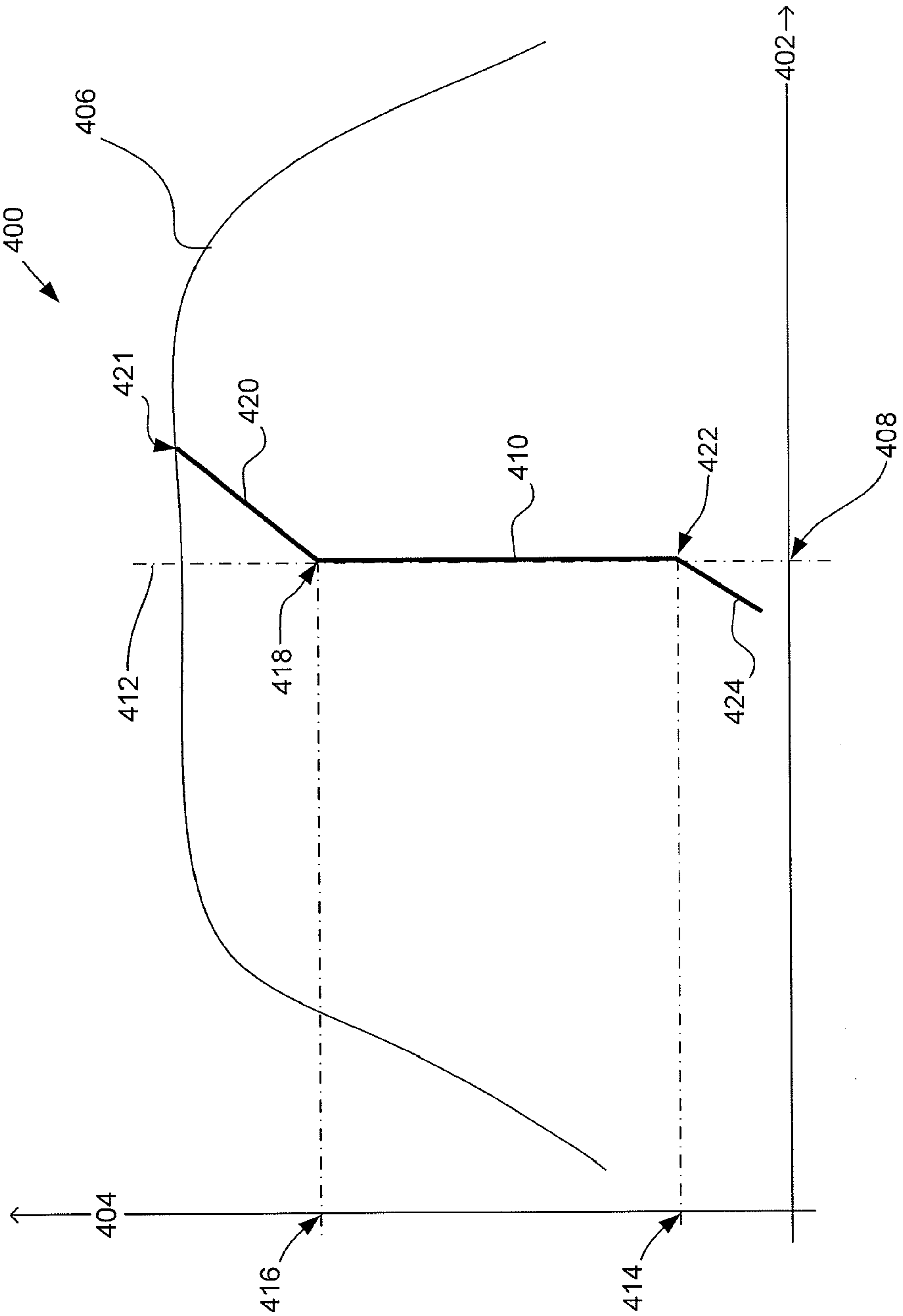
FIG. 4 is a graphical illustration of one embodiment of an engine droop function in accordance with the disclosure.

FIG. 4 illustrates an engine map 400 having engine speed plotted along the horizontal axis 402 and engine torque output plotted along the vertical axis 404. A lug curve 406 represents the maximum attainable engine torque over the range of operating engine speed. For purpose of illustration, a desired engine speed 408 is identified on the engine map 400. The desired engine speed 408 may represent a desired speed for the engine under conditions of little to no load utilization. During operation, the engine droop function 302 (FIG. 3) may control the operation of the engine such that the engine speed is maintained constant over a relatively narrow band or range of engine torque output, and is changed in accordance with the droop function utilized over other ranges of engine torque output.

As shown in the graph, a range of torque utilization is represented by a torque range 410 over which speed is constant. The constant speed range 410 extends along a vertical line 412 corresponding to the desired engine speed 408. Thus, the desired engine speed 408 may be maintained when the engine is operating within the constant speed range 410, or, when the engine is required to produce more than a minimum torque 414 and less than a maximum torque 416. In one embodiment, the minimum torque 414 and the maximum torque 416 are selected to correspond to the expected range of torque utilization that is required to operate essential machine components and systems, such as cooling fans, A/C compressors, lights, heating systems, and so forth. The constant speed range 410 can be selected to be as narrow or as broad as desired to ensure that there are no perceptible changes to the operation of the engine if the machine is maintained in idle operation.

When the engine is operating outside of the constant speed range 410, and the engine droop function 302 determines that a change in torque utilization is imminent, or alternatively, in response to a change in torque utilization, the engine will accelerate beyond the desired engine speed 408 as torque utilization increases and operate in a range of increasing engine speed and load 420. Under such conditions, the engine torque output will increase as long as the operating point of the engine exceeds the maximum torque 416 and engine torque output exceeds the torque corresponding to an inflection point 418. Such increase in engine torque output may be selected to occur with an increase in actual and/or expected torque utilization.

In the illustrated embodiment, the range of increasing engine speed and load 420 is linear having a positive slope. Accordingly, engine speed and engine torque output will increase to provide sufficient torque output capability to meet the torque utilization requirements of the machine. Such increase of engine speed, coupled with an increase in torque output, may be referred to as a "negative" droop behavior of the engine. One can appreciate that the linear range of increasing engine speed and load 420 will intersect the lug curve 406 and a point of maximum torque 421, which may optionally be selected to represent a maximum or rated torque of the engine.

In addition to increasing engine speed with increasing torque utilization, such negative droop behavior may be implemented for lower engine speeds and torque outputs. As illustrated in the graph 400, a reduction in actual or expected torque utilization may cause the engine torque output to decrease below the minimum torque 414. Under such conditions, the engine operating point on the map will pass over an inflection point 422 and enter a range of decreasing engine speed and load 424. The range of decreasing engine speed and load 424 causes the engine speed to reduce in response to reducing torque utilization of the machine. Such reduction may be performed to avoid a wasted torque utilization that would otherwise be consumed, for example, in hydraulic pumps operating in a standby mode and/or as friction in various engine and machine components. Additionally, such reduction in engine torque utilization may reduce fuel consumption and noise.

Returning now to the block diagram for the engine governor 216 of FIG. 3, an engine command output 322 is provided from the engine droop function 302. The engine command output 322 may be determined in accordance with the negative droop functionality based on the current engine operating state, as indicated by the engine signal 304, and the current and/or expected level of torque utilization, as indicated by the load signal 312. The engine command output 322 may be provided in any appropriate form, for example, as a fueling command, engine speed command, torque command, and so forth. In one embodiment, the engine command output 322 represents an engine speed setting for the engine, which is equal to the desired engine speed setting minus an engine droop adjustment speed value that is based on engine torque output or engine fueling rate.

The engine command output 322 is optionally provided to an engine control function 324, which may include any appropriate algorithm(s) that control the operating parameters of the engine. Such algorithms may include appropriate command functions controlling engine fueling, engine speed, and/or any other suitable control scheme that can output a command 326 to an engine component or system. In one embodiment, for example, the engine signal 304 may be a desired fueling command, expressed in mg/stroke of fuel, which is provided to a lookup table (not shown) embedded within the engine control function 324. The output of the lookup table may be a pulse-width command for the fuel injectors (not shown) of the engine, which is provided as the command 326 either directly to the injectors or to a fuel injection controller (not shown) of the engine.

Figure 5:
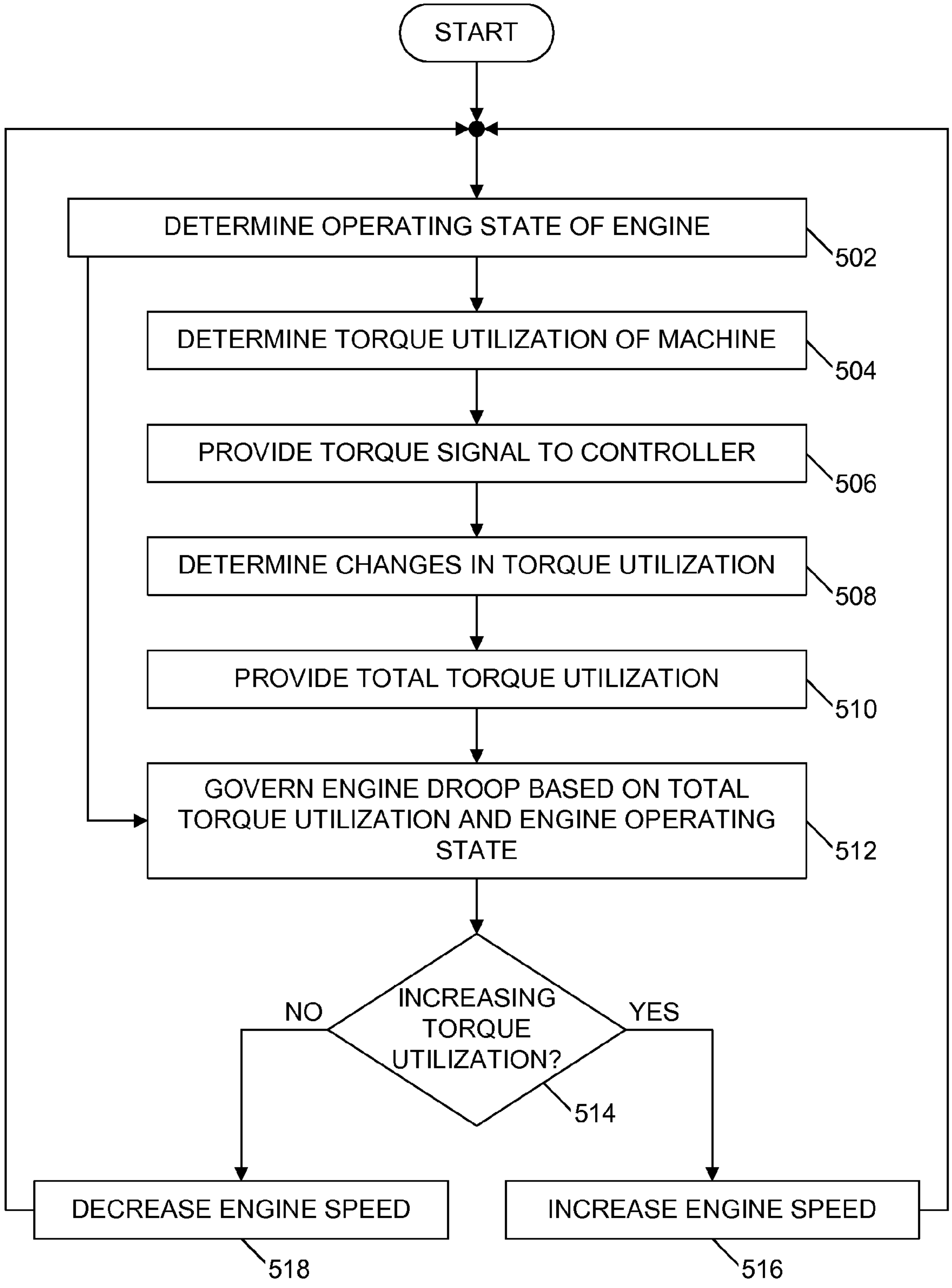
FIG. 5 is a flowchart for a method of operating an engine in accordance with the disclosure.

A flowchart for a method of governing the operation of an engine for a machine is shown in FIG. 5. Even though a series of processes is illustrated, any of these processes can be performed in substantially any order. In one embodiment, various process steps are intended to be executed by an electronic controller or computer and retrieved from a computer-readable medium, but any other electronic or mechanical method may be used instead.

In the flowchart, the electronic controller determines an operating state of the engine at 502. Such determination may be accomplished based on information signals that are indicative of at least one engine operating parameter, such as engine speed, engine torque output, or any other appropriate parameter.

A determination of torque utilization by various machine systems at 504 serves as a basis for providing a torque signal that is indicative of current torque utilization to the controller at 506. The torque signal may include measured and/or estimated torque utilization parameters of various components and systems of the machine. In one embodiment, the determination of the torque signal at 506 includes calculations of torque utilization that are based on measured pressures within a hydraulic system, pump speed, and/or other parameters. In addition to the calculations based on measured parameters, estimations of torque utilization may be performed for components whose torque utilization cannot be controlled, such as the utilization occurring in a transmission or power stored in a rotating flywheel.

A determination of actual or expected changes in torque utilization is performed at 508. Such determination may be based on monitoring machine parameters and calculating rates of change thereof. In one embodiment, the determination of expected changes in torque utilization depends, at least in part, on changes of parameters that are known to result in a change in torque utilization. Examples of parameters that may be used to determine an imminent change in torque utilization include operator control signals, signals commanding an initiation of a device, such as a cooling motor, and others.

A correction to the torque signal at 506 that accounts for any expected changes in torque utilization determined at 508 is performed at 510 to yield a total torque utilization signal. The total torque utilization signal from 510, along with the information about the operating state of the engine from 502, are provided to an engine droop governor at 512. The engine droop governor operates to determine whether a change in the operating state of the engine is required to provide sufficient power that meets the total torque utilization requirements of the machine. In one embodiment, the engine droop governor performs a first decision of whether the total torque utilization is increasing at 514. When the torque utilization increases, a decision is made to increase the speed of the engine at 516. Similarly, a decreasing total torque utilization causes the speed of the engine to reduce at 518. Such changes in engine speed as occurring as a result of the processes at 516 or 518 may be performed in a fashion that maintains the engine speed constant over a predetermined range of engine torque output as shown, for example, in the graph 400 illustrated in FIG. 4. Having appropriately adjusted the engine speed, the process may repeat continuously during engine operation.

Figure 6:
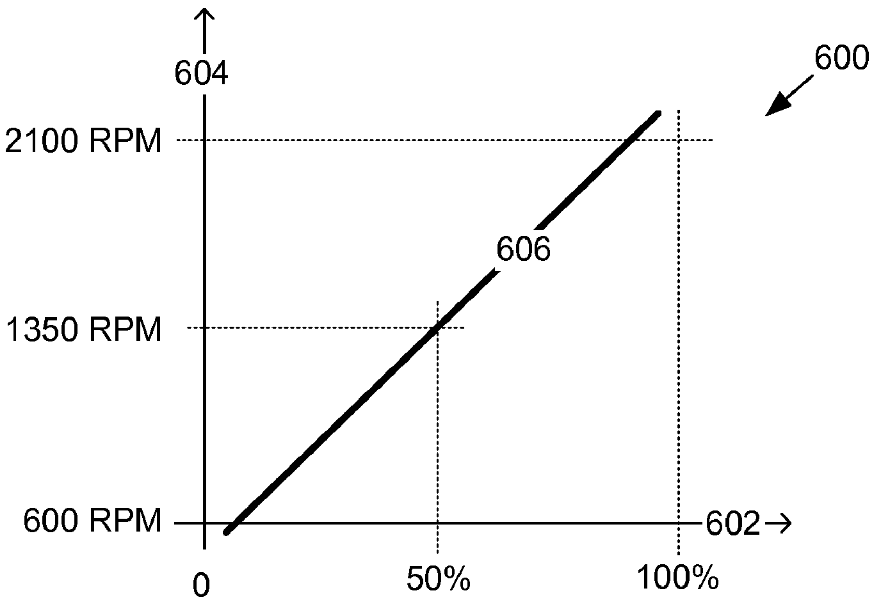
FIG. 6 is a graphical representation of a transfer function between a throttle setting and a desired engine speed setting in accordance with the disclosure.
Figure 7:
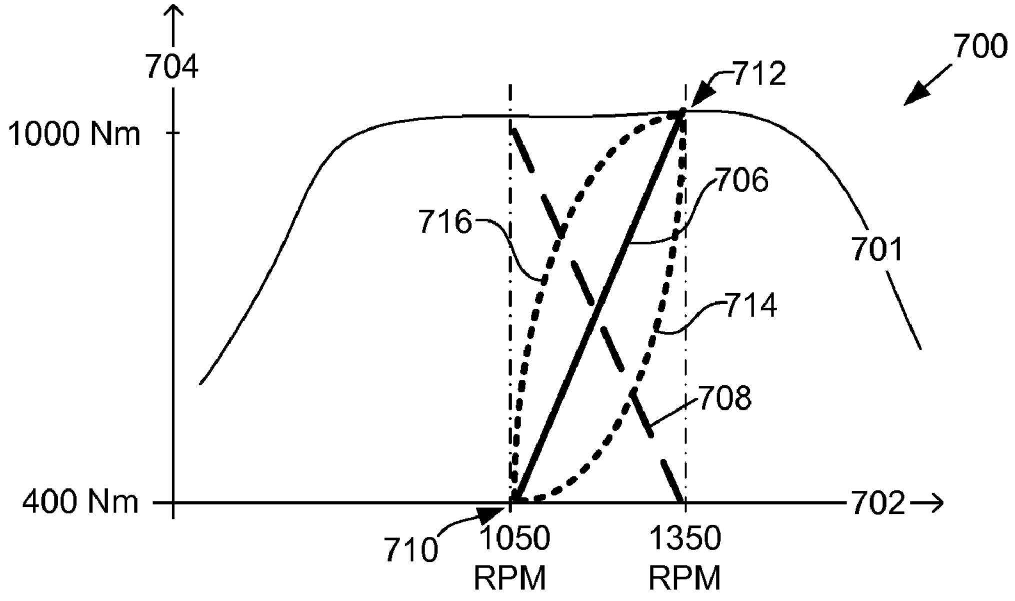
FIG. 7 is a graphical representation of a family of curves for various embodiments of engine droop functions in accordance with the disclosure, which are plotted on an engine map that includes a graphical representation of a positive droop function for contrast.

One exemplary embodiment of a particular implementation of a negative droop governor is discussed below relative to the illustrations of FIG. 6 and FIG. 7. FIG. 6 represents a transfer function 600 for determining a desired engine speed 604 based on a throttle position 602 signal, and FIG. 7 represents one embodiment for a negative droop function 700, which is shown plotted on an engine map. In this embodiment, a desired engine-speed setting of the engine is modified based on the utilization of engine load by various components and systems of a machine. Modification of the desired engine speed setting is accomplished by a determination of an increase in value that is applied to the desired engine speed setting. Such increase value, or "droop RPM," is determined as a function of a constant and of load, which in this embodiment is represented by the amount of fuel in cubic millimeters ($mm^3$) that is injected in each cylinder per stroke.

More specifically, the transfer function 600 is a two dimensional function correlating a throttle position signal, which is plotted along a horizontal axis 602 and expressed in terms of percentage (%) of a maximum throttle displacement, with a desired engine speed setting for the engine. The desired engine speed setting is plotted along a vertical axis 604 and expressed in terms of engine revolutions per minute (RPM). In this embodiment, the engine RPM is shown to extend within a range of about 600 RPM, which represents a low-idle speed, to about 2100 RPM, which represents a high-idle speed. A line 606 represents the correlation used by the transfer function 600. The line 606 is a straight line that graphically represents the transfer function 600. For example, a desired engine speed setting of 1350 RPM will be provided by the transfer function 600 when the throttle has been displaced to a position corresponding to 50% of maximum or 100% travel.

The desired engine-speed setting along the axis 604 that corresponds to the throttle position 602 is provided to the engine of a machine via, for example, an appropriate command to an engine controller, such that the engine operates at that setting. Before commanding the engine to operate at such desired engine speed setting, however, an engine droop function 700 is used to adjust the engine speed setting. One example of a particular droop function is shown in FIG. 7. The engine droop function 700 is shown plotted on an engine map of a lug line 701 having engine speed (expressed in RPM) 702 plotted along the horizontal axis, and engine load or torque output 704 plotted along the vertical axis. Two engine speeds, 1050 RPM and 1350 RPM, are plotted on the graph for illustration. The first engine speed of 1050 RPM represents a low engine operating speed, and the second engine speed of 1350 RPM represents a high engine operating speed.

A negative droop line 706 is plotted as a straight line diagonally connecting a point representing a low engine torque output at the low engine operating speed and another point representing a high engine torque, shown as a maximum torque on the lug line 701, at the high engine operating speed. The negative droop line 706 is a graphical representation of the negative droop function that increases engine speed as the load on the engine or, alternatively, the engine torque output, increases. A positive droop function, represented by a dashed line 708, is shown for contrast. As can be appreciated, the positive droop line 708 correlates engine speed and engine torque output such that the engine speed decreases as engine torque output increases. As discussed above, such behavior is typical for engine governors and opposite to the effects of the negative droop governor in accordance with the principles of the present disclosure.

In one embodiment, an engine speed setpoint, RPM_SP, is provided to an engine control module, for example, the engine control function 324 shown in FIG. 3. The engine speed setpoint RPM_SP can be calculated according to the following equation:

$$\text{RPM\_SP}=\text{RPM\_}\mathit{DES}+\text{RPM\_}\mathit{DROOP}$$

where RPM_DES is a desired engine speed determined based on a signal from a throttle controller based on a transfer function as described, for example, and shown relative to FIG. 6, and RPM_DROOP is a factor increasing the desired engine speed that is determined based on a droop factor and a fuel value. The droop factor can be a constant value or it may alternatively be a variable that is based on any appropriate machine or engine operating parameter, such as engine speed, engine torque output, and so forth, or it may further be based on a rate of change of any such operating parameter. In one exemplary embodiment, the droop factor is about 1.5 (RPM/$mm^3$), which indicates that the speed setting of the engine is adjusted by 1.5 revolutions per minute per cubic millimeter of fuel being injected into each cylinder of the engine per stroke. As is known, fuel amounts injected into the cylinders of the engine is proportional or at least correlated to the torque output of the engine for compression ignition or diesel engines.

According, therefore, to the above equation for the engine speed setpoint RPM_SP and to the throttle and engine droop functions shown respectively in FIG. 6 and FIG. 7, a 39% setting on the throttle will correspond to a desired engine speed setting (see, for example, FIG. 6) RPM_DES of 1050 RPM. Assuming that the fuel rate at the lug line 701 (FIG. 7) is about 200 $mm^3$, then the correction factor (RPM_DROOP) at the droop factor of 1.5 (RPM/$mm^3$) will be about 300 RPM. This correction, added to the RPM_DES, yields a new engine speed setting of 1350 RPM for the engine. One can appreciate that such adjustment of engine speed setting will occur according to the shape of the engine droop function. In the example presented, such shape is linear and will, thus, cause the engine speed to change in a linear or proportional fashion as the fuel rate increases, but other functions may be used. Moreover, an optimal relationship between the engine speed setting and the engine load output may be determined experimentally or graphically from a collection of points on the engine map. Such graphical determination may be accomplished by fitting a line or other curve to a collection of points. In one embodiment, such a graphical determination of an optimal engine droop function may be accomplished by collecting engine operating points, plotting such points on the engine map, and fitting such points to a line or curve by considering an acceptable band of, for example, ±10% around the fitted line or curve.

The shape of the curve used may be adjusted to provide a desired, maximum performance and efficiency. For example, the shape of the droop function may be a curve belonging to a family of curves interconnecting two points on the engine map 700. Two such endpoints are illustrated in the engine map 700 and represent the range of engine speed settings and engine torque outputs that can be controlled by the engine droop function. In the illustrated example, a first point 710 represents an operating state of the engine in which the engine speed setting is 1050 RPM and the engine torque output is 400 Nm. A second point 712 represents a condition when the engine speed setting is 1350 RPM and the engine torque output is 1000 Nm. As can be appreciated, the engine droop function 706 is represented on the engine map 700 by a straight line interconnecting the first point 710 with the second point 712. One alternative engine droop function 714 having a parabolic shape is shown interconnecting the first and second points 710 and 712. Operation of the engine under the control of the alternative engine droop function 714 may, for example, increase the rate of acceleration of the engine in a parabolic fashion as load increases.

An additional alternative embodiment for an engine droop function 716 is illustrated on the engine map 700. The engine droop function 716 has an exponential shape, as distinguished from the linear shape or the parabolic shape of, respectively, the engine droop functions 706 and 714. One can appreciate that the three engine droop functions 706, 714, and 716 represent a subset of the family of curves that may interconnect the first and second points 710 and 712. Other types of curves belonging to the same family may include graphical representations of quadratic functions, logarithmic functions, and any type of polynomial function, when plotted on the engine map.

In the illustrated example of the engine droop function 716, an equation or function may be coded into an engine or other electronic controller of the machine, which function may continuously calculate the change to the engine speed setting. An equation for one such function is presented below:

$$\text{RPM\_DRP} = \text{RPM\_MIN} + a^{*}(\text{TQ\_CUR} - \text{TQ\_MIN})^{\left[\frac{LN(\text{RPM\_MAX}-\text{RPM\_MIN})/a)}{\text{LN}(\text{TQ\_MAX}-\text{TQ\_MIN})}\right]}$$

where RPM_DRP is the change in engine speed setting, RPM_MIN and RPM_MAX are, respectively, the minimum and maximum engine speeds between which the engine droop function operates, for example, 1050 RPM and 1350 RPM respectively, TQ_CUR is the current torque output of the engine, TQ_MIN and TQ_MAX are, respectively, the minimum and maximum engine torque outputs between which the engine droop function begins adjusting the engine speed setting, and $\alpha$ is a positive coefficient, preferably between 0 and 1, the value of which determines the shape of the engine droop function. In this exemplary embodiment, the engine speed setting may be maintained at 1050 RPM for engine torque output values below 400 Nm.

Figure 8:
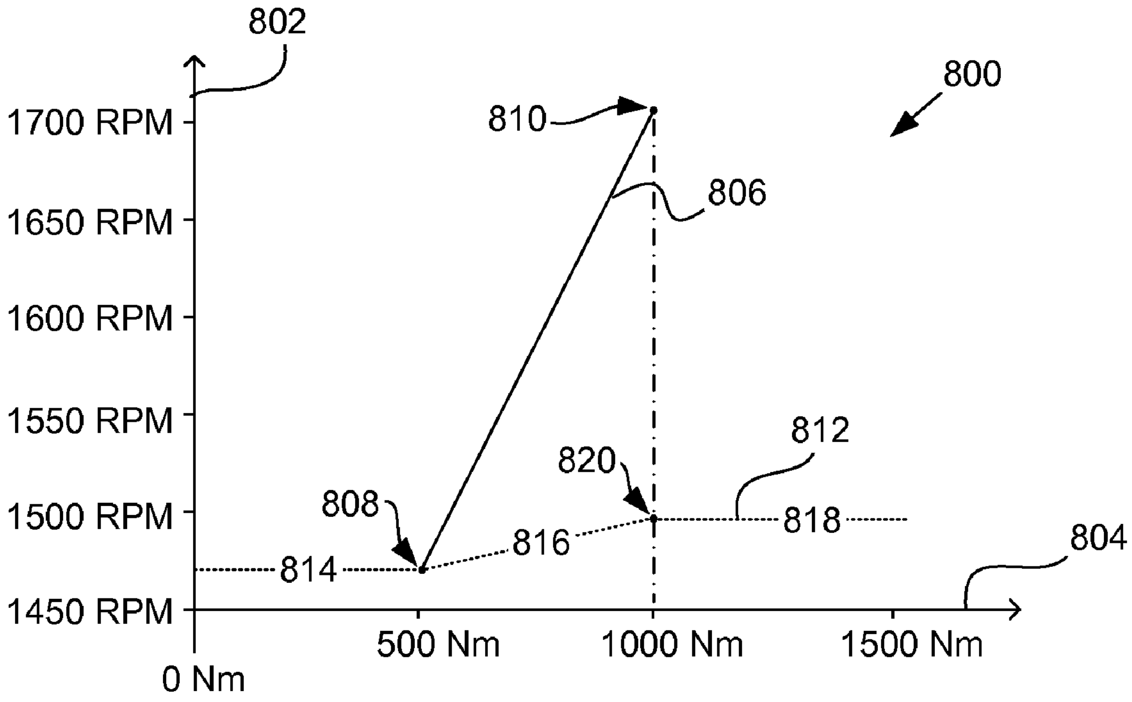
FIG. 8 is a graphical representation of an alternative embodiment for a negative droop function.

A graphical representation of an alternative embodiment for a negative droop function is provided in the graph 800 illustrated in FIG. 8. The graph 800 is a two dimensional graph having engine speed, expressed in terms of RPM, plotted against a vertical axis 802, and engine torque output, expressed in terms of Nm, plotted against a horizontal axis 804. Values representative of one exemplary engine application are provided in the graph 800 for illustration.

Referring now to the graph 800 of FIG. 8. a negative droop function 806 is illustrated in a linear form. The negative droop function 806 in this embodiment interconnects a first point, 808 to a second point 810 on the engine map. The first point 808 corresponds to an engine operating condition having an engine speed of about 1475 RPM at a torque output of about 500 Nm. The second point 810 corresponds to an engin operating condition having an engine speed of about 1700 RPM at a torque of about 1000 Nm.

An underspeed function 812 is plotted on the graph 800 as a linear function having a first segment 814, a second segment 816, and a third segment 818. In the illustrated embodiment for the underspeed function 812, each of the first, second, and third segments 814, 816, and 818 are shown as linear functions. As can be seen in the graph 800, the first segment 814 extends over a range of torque output that begins at about zero, which represents no torque imposed on the engine, up to the first point 808, which represents a torque of about 500 Nm. The first segment 814 generally parallel to the horizontal axis, which represents a constant engine speed of about 1475 RPM that is maintained when the torque output of the engine is below about 500 Nm. In a similar fashion, the third segment 818 extends above the engine torque output corresponding to the second point 810. which can be defined as a third point 820, and represents a constant engine speed of about 1500 RPM that is maintained when the engine torque output exceeds about 1000 Nm.

The second segment 816 interconnects the first point 808 with the third point 820 and lies below the negative droop function 806. In the embodiment illustrated in FIG. 8. the second segment 816 has a positive slope that is less than the slope of the negative droop function 806.

INDUSTRIAL APPLICABILITY

One disadvantage of known droop functions for controlling engines is that their effect is only applied under extreme operating conditions, for example, at operation close to the lug curve. Hence, the '214 patent does little to improve engine fuel consumption unless the engine is operating close to the lug line. Similarly, the droop governor disclosed in the '589 patent does little to improve fuel economy and noise emissions of the engine unless the engine is operating at a generally constant load.

The present disclosure is applicable to machines that include an internal combustion engine arranged to provide a torque output to various components and systems of the machine. Operation of the engine in accordance with the principles described herein can advantageously provide machine operation with improved fuel consumption and noise attributes than previously possible. Moreover, the disclosed principles can advantageously be implemented in existing machines.

In one aspect, the disclosure is applicable to a machine having an internal combustion engine disposed to operate in response to a control signal provided by an engine governor. The engine is further disposed to provide a torque output to at least one machine system operating to utilize such torque output to provide a machine function. The machine includes an electronic controller in operable communication with the engine governor and the at least one machine system. The electronic controller is disposed to determine a current operating state of the engine and a torque utilization of the at least one machine system. The electronic controller compares the current operating state of the engine with the torque utilization in an engine droop function, and instructs a change to an engine speed setting of the engine in response to a change in the torque signal. Such change is to increase the engine speed setting when the torque utilization is increasing, and to decrease the engine speed setting when the torque utilization is decreasing.

In one exemplary embodiment, the machine may include a propel system utilizing a portion of the torque output of the engine, and an implement system disposed to utilize an additional portion of the torque output of the engine. In such embodiment, the electronic controller is disposed to determine the torque utilization of the propel system and the implement system. Moreover, the machine may include an operator control device providing a command signal that influences the torque utilization of at least one machine system. Such command signal may be used as a basis for determining an expected change in the torque utilization of the machine system.

The engine droop function can include a range of increasing engine speed and increasing engine torque output, which is expressed by a linear function having a positive slope when plotted on a graph having engine speed plotted along a horizontal axis and engine torque output plotted along a vertical axis, such that the engine speed setting increases as the torque utilization increases. The engine droop function can further include a range of decreasing engine speed and decreasing engine torque output, which is expressed by a linear function also having a positive slope, and a range of constant engine speed, which can be expressed by a linear function extending vertically on the graph and represents a constant engine speed setting over a torque range connecting the range of increasing engine speed and the range of decreasing engine speed.

In one general aspect, the disclosure describes a method of operating an engine associated with a machine. The engine may be connected to at least one machine system and disposed to operate at an engine speed setting in response to a control signal provided by an engine governor. The engine may provide a torque output to the at least one machine system. The method of operating the engine may include determining an operating state of the engine and a torque utilization of the at least one machine system. A change in torque utilization of the machine may be determined and combined with the torque utilization into a torque signal. The torque signal is provided to the engine governor, which in turn provides the control signal governing the speed setting of the engine based on the torque signal and the operating state of the engine. Such control signal results in an increase of the engine speed setting when the torque signal increases. Similarly, a decrease in the torque signal causes the engine speed setting to decrease.

In one embodiment, such change in the torque signal includes at least one of a change in the torque utilization of the at least one machine system and an expected change in the torque utilization of the at least one machine system. In such embodiment, the method may further include determining the expected change in the torque utilization based on, at least in part, a change in a position of an operator control device. In general, the operating state of the engine may include a parameter indicative of the engine speed and an additional parameter indicative of engine torque output.

In one general aspect, the control signal provided based on the torque signal and the operating state of the engine may be provided by an engine droop function, which includes a predetermined relationship between the engine speed and engine torque output. The engine droop function may include a range of increasing engine speed and increasing engine torque output, which is expressed as a line having a positive slope on an engine map, and a range of decreasing engine speed and decreasing engine torque output, which is expressed as a line having a positive slope on the engine map. The engine droop function may further include a range of constant engine speed, which is represented on the engine map as a vertical line segment connecting the range of increasing engine speed and increasing engine torque output with the range of decreasing engine speed and decreasing engine torque output.

The principles provided in the disclosure are further applicable to a computer-readable medium having thereon computer-executable instructions for controlling a speed of an engine providing a torque output to at least one system within a machine. The computer-executable instructions include instructions for determining an operating state of the engine and instructions for determining a torque utilization of the at least one system. Instructions for determining a change in torque utilization of the machine, and instructions for providing a torque signal based on the torque utilization and the change in torque utilization, are executed during operation. Thereafter, instructions for governing the speed of the engine based on the torque signal, which cause the speed of the engine to increase when the torque signal increases and the speed of the engine to decrease when the torque signal decreases, are executed.

Such computer-readable medium may include instructions for positively correlating the speed of the engine with the torque signal in a linear relationship. Optionally, the instruction for determining a change in the torque utilization may include instructions for quantifying an imminent change in the torque utilization based on a command signal that is provided by an operator control device that is disposed to influence the torque utilization of the at least one system. Further, the instructions for determining the operating state of the engine may include instructions for determining an operating speed of the engine and instructions for determining an engine torque output of the engine, which may be provided to an engine map. In one embodiment, the instructions for governing the speed of the engine may include instructions for tabulating the operating state of the engine and instructions for comparing the engine torque output with the torque signal on the engine map. In general, instructions for increasing the speed of the engine in anticipation of an increase in the torque utilization may be executed in a machine.

We claim:

1. A machine including an engine disposed to operate in response to a control signal provided by an engine governor, the engine further disposed to provide a torque output to at least one machine system operating to utilize at least a portion of the torque output to provide a machine function, the machine comprising:

- an electronic controller in operable communication with the engine governor and the at least one machine system, the electronic controller disposed to:
  - determine a current operating state of the engine;
  - determine a torque utilization of the at least one machine system;
  - compare the current operating state of the engine with the torque utilization in an engine droop function;
  - increase the engine speed setting when the torque utilization is increasing; and
  - decrease the engine speed setting when the torque utilization is decreasing.

2. The machine of claim 1, wherein the at least one machine system is a propel system of the machine utilizing a portion of the torque output of the engine, wherein the machine further includes an implement system disposed to utilize an additional portion of the torque output of the engine, and wherein the electronic controller is disposed to determine the torque utilization of the propel system and the implement system.

3. The machine of claim 1, further including an operator control device providing a command signal that influences the torque utilization of the at least one machine system, wherein the electronic controller is further disposed to determine an expected change in the torque utilization of the at least one machine system based on the command signal.

4. The machine of claim 1, wherein the engine droop function is expressed by the following equation:

$$\mathrm{RPM\_DRP} = \mathrm{RPM\_MIN} + a^{*}(\mathrm{TQ\_CUR} - \mathrm{TQ\_MIN})^{\left[\frac{LN(\mathrm{RPM\_MAX}-\mathrm{RPM\_MIN})/a)}{\mathrm{LN(TQ\_MAX}-\mathrm{TQ\_MIN)}}\right]}$$

where RPM_DRP is a change in engine speed setting, RPM_MIN and RPM_MAX are, respectively, a minimum engine speed and a maximum engine speed between which the engine droop function is applied, TQ_CUR is a current torque output of the engine, TQ_MIN and TQ_MAX are, respectively, a minimum and a maximum engine torque outputs between which the engine droop function is applied, and a is a coefficient that is greater than zero.

5. The machine of claim 1, the engine droop function includes a range of increasing engine speed and increasing engine torque output, which when plotted on a graph having the engine speed plotted along a horizontal axis and engine torque output plotted along a vertical axis approaches a first function having a positive slope within a band of ±10% around the first function, such that the engine speed increases when the engine torque output increases above a high torque setting.

6. The machine of claim 5, wherein the first function has at least one of a linear, exponential, parabolic, logarithmic, and polynomial shape.

7. The machine of claim 5, wherein the engine droop function further includes a range of decreasing engine speed and decreasing engine torque output, which when plotted on a graph having the engine speed plotted along a horizontal axis and engine torque output plotted along a vertical axis approaches a second function having a positive slope within a band of ±10% around the second function, such that the engine speed decreases when the engine torque output decreases below a low torque setting.

8. The machine of claim 7, wherein the engine droop function further includes a range of constant engine speed, which when plotted on a graph having the engine speed plotted along a horizontal axis and engine torque output plotted along a vertical axis approaches a linear function extending vertically with respect to the horizontal axis within a band of ±10% around the linear function, such that the engine speed setting remains constant when the engine torque output is between the low torque setting and the high torque setting of the engine.

9. A method of operating an engine associated with a machine, the engine connected to at least one machine system and disposed to operate at an engine speed setting in response to a control signal provided by an engine governor, the engine further disposed to provide a torque output to the at least one machine system, the method comprising:

- determining an operating state of the engine;
- determining a torque utilization of the at least one machine system;
- determining a change in the torque utilization of the machine;

combining the torque utilization and the change in the torque utilization into a torque signal, and providing the torque signal to the engine governor;

providing the control signal governing the engine speed setting based on the torque signal and the operating state of the engine, such that:

an increase in the torque signal causes the engine speed setting to increase; and a decrease in the torque signal causes the engine speed setting to decrease.

10. The method of claim 9, wherein the operating state of the engine includes a parameter indicative of the engine speed and an additional parameter indicative of engine torque output.

11. The method of claim 9, wherein the change in the torque signal includes at least one of a change in the torque utilization of the at least one machine system and an expected change in the torque utilization of the at least one machine system.

12. The method of claim 11, further including determining the expected change in the torque utilization based on, at least in part, a change in a position of an operator control device.

13. The method of claim 9, wherein the control signal provided based on the torque signal and the operating state of the engine is performed by an engine droop function, which function includes a predetermined relationship between the engine speed and engine torque output.

14. The method of claim 13, wherein the engine droop function, when plotted on engine map having the engine speed plotted along the horizontal axis and the engine torque output plotted against the vertical axis, includes a range of increasing engine speed and increasing engine torque output, which approximates a line, within a band of ±10%, the line having a positive slope within a band of ±10% on the engine map, and a range of decreasing engine speed and decreasing engine torque output, which approximates a line, within a band of ±10%, the line having a positive slope on the engine map.

15. The method of claim 13, wherein the engine droop function is expressed by the following equation:

$$\text{RPM\_DRP} = \text{RPM\_MIN} + a^{*}(\text{TQ\_CUR} - \text{TQ\_MIN})^{\left[\frac{LN(\text{RPM\_MAX}-\text{RPM\_MIN})/a)}{\text{LN}(\text{TQ\_MAX}-\text{TQ\_MIN})}\right]}$$

where RPM_DRP is a change in engine speed setting, RPM_MIN and RPM_MAX are, respectively, a minimum engine speed and a maximum engine speed between which the engine droop function is applied, TQ_CUR is a current torque output of the engine, TQ_MIN and TQ_MAX are, respectively, minimum and maximum engine torque outputs between which the engine droop function is applied, and where $\alpha$ is a coefficient that is greater than zero.

16. A computer-readable medium having thereon computer-executable instructions for controlling a speed of an engine providing a torque output to at least one system within a machine, the computer-executable instructions comprising:

instructions for determining an operating state of the engine;

instructions for determining a torque utilization of the at least one system;

instructions for determining a change in the torque utilization of the machine;

instructions for providing a torque signal based on the torque utilization and the change in the torque utilization; and instructions for governing the speed of the engine based on the torque signal, which causes the speed of the engine to increase when the torque signal increases and the speed of the engine to decrease when the torque signal decreases.

17. The computer-readable medium of claim 16, wherein the speed of the engine is positively correlated with the torque signal in at least one of a linear, parabolic, exponential, logarithmic, and polynomial relationship.

18. The computer-readable medium of claim 16, wherein the instruction for determining a change in the torque utilization further include instructions for quantifying an imminent change in the torque utilization based on a command signal that is provided by an operator control device that is disposed to influence the torque utilization of the at least one system.

19. The computer-readable medium of claim 16, wherein the instructions for determining the operating state of the engine include instructions for determining an operating speed of the engine and instructions for determining an engine torque output of the engine, and wherein the computer-readable medium further includes instructions for providing the operating speed and the engine torque output to an engine map.

20. The computer-readable medium of claim 16, further including instructions for increasing the speed of the engine in anticipation of an increase in the torque utilization.

* * * * *

UNITED STATES PATENT AND TRADEMARK OFFICE

CERTIFICATE OF CORRECTION

PATENT NO. : 8,175,790 B2
APPLICATION NO. : 12/366477
DATED : May 8, 2012
INVENTOR(S) : Stemler et al.

It is certified that error appears in the above-identified patent and that said Letters Patent is hereby corrected as shown below:

In the Specification

Column 13, line 7, delete “an engin” and insert -- an engine --.

Column 13, line 24, delete “point 810.” and insert -- point 810, --.

Column 13, line 30, delete “FIG. 8” and insert -- FIG. 8, --.

In the Claims

Column 16, line 24, in Claim 4, delete “a” and insert -- α --.

Signed and Sealed this
Eighteenth Day of August, 2015

Michelle K. Lee
*Director of the United States Patent and Trademark Office*